(12) United States Patent
Kim et al.

(10) Patent No.: US 12,465,492 B2
(45) Date of Patent: Nov. 11, 2025

(54) HIP OFF-LOADING DEVICE AND METHOD

(71) Applicant: Texas Scottish Rite Hospital for Children, Dallas, TX (US)

(72) Inventors: Harry K.W. Kim, Dallas, TX (US); Mikhail L. Samchukov, Coppell, TX (US); Brad Niese, Southlake, TX (US)

(73) Assignee: Texas Scottish Rite Hospital for Children, Dallas, TX (US)

( * ) Notice: Subject to any disclaimer, the term of this patent is extended or adjusted under 35 U.S.C. 154(b) by 1112 days.

(21) Appl. No.: 17/433,526

(22) PCT Filed: Feb. 24, 2020

(86) PCT No.: PCT/US2020/019480
§ 371 (c)(1),
(2) Date: Aug. 24, 2021

(87) PCT Pub. No.: WO2020/176404
PCT Pub. Date: Sep. 3, 2020

(65) Prior Publication Data
US 2022/0151791 A1    May 19, 2022
US 2023/0000632 A2    Jan. 5, 2023

Related U.S. Application Data

(60) Provisional application No. 62/811,049, filed on Feb. 27, 2019.

(51) Int. Cl.
*A61F 2/32*      (2006.01)
*A61B 17/56*     (2006.01)
(Continued)

(52) U.S. Cl.
CPC .............. *A61F 2/32* (2013.01); *A61B 17/72* (2013.01); *A61B 17/8085* (2013.01);
(Continued)

(58) Field of Classification Search
CPC ..... A61F 2/32; A61B 17/80; A61B 2017/567; A61B 2017/681
See application file for complete search history.

(56) References Cited

U.S. PATENT DOCUMENTS 4,185,623 A    1/1980  Volkov et al.
6,162,223 A   12/2000  Orsak et al.
(Continued)

FOREIGN PATENT DOCUMENTS

| GB | 2250919 A    |   | 6/1992 |             |
|----|--------------|---|--------|-------------|
| JP | 2007167319 A | * | 7/2007 | A61B 17/56  |
| WO | 2020176404 A1|   | 9/2020 |             |

OTHER PUBLICATIONS

International Search Report and Written Opinion for PCT/US2020/019480 by the Australian Patent Office, Apr. 14, 2020, 10 pp.

*Primary Examiner* — Christopher D. Prone
(74) *Attorney, Agent, or Firm* — Edwin S. Flores; Daniel J. Chalker; Chalker Flores, LLP

(57) ABSTRACT

The present invention includes a hip-off-loading device including a pelvic assembly including a pelvic base plate configured for attachment to a human pelvis; a distraction adjustment mechanism coupled to the pelvic base plate, wherein the distraction adjustment mechanism is lockable, to provide for adjusting the distal distraction of the hip-off-loading device; and at least a portion of a rotation mechanism to provide for internal or external rotation or both, and to provide for non-dynamic interoperative adjustment of abduction, adduction, or both; a link movably coupled to the pelvic assembly to provide for internal or external rotation or both; and a femoral assembly coupled to the link and including a femoral attachment mechanism for attachment to a femur to provide for flexion, extension, or both.

15 Claims, 19 Drawing Sheets

(51) Int. Cl.
    *A61B 17/68*    (2006.01)
    *A61B 17/72*    (2006.01)
    *A61B 17/80*    (2006.01)
    *A61F 2/30*     (2006.01)

(52) U.S. Cl.
    CPC ... *A61B 2017/567* (2013.01); *A61B 2017/681* (2013.01); *A61B 17/80* (2013.01); *A61F 2002/30405* (2013.01); *A61F 2002/30471* (2013.01); *A61F 2002/30507* (2013.01); *A61F 2002/30518* (2013.01); *A61F 2002/30538* (2013.01); *A61F 2002/3055* (2013.01)

(56) References Cited

U.S. PATENT DOCUMENTS

| | | |
|---|---|---|
| 9,044,270 B2 | 6/2015 | Gabriel et al. |
| 9,763,654 B2 * | 9/2017 | Van Dyke ............. A61B 17/66 |
| 2004/0030395 A1 | 2/2004 | Blunn et al. |
| 2012/0046754 A1 | 2/2012 | Clifford et al. |
| 2014/0358231 A1 | 12/2014 | Landry et al. |
| 2015/0366587 A1 | 12/2015 | Van Dyke et al. |
| 2016/0030028 A1 * | 2/2016 | Van Dyke ............ A61B 17/025 606/90 |
| 2016/0262912 A1 | 9/2016 | Burnikel et al. |

* cited by examiner

HIP OFF-LOADING DEVICE AND METHOD

CROSS-REFERENCE TO RELATED APPLICATIONS

This application is a National Stage of International Application of PCT/US2020/019480, filed Feb. 24, 2020, which claims the benefit of U.S. Provisional Application No. 62/811,049 filed Feb. 27, 2019. The contents of each of which are incorporated by reference in their entirety.

STATEMENT OF FEDERALLY FUNDED RESEARCH

Not applicable.

TECHNICAL FIELD OF THE INVENTION

The present invention relates in general to the medical treatment of human joints. In particular, the present invention relates to medical treatment of human hip joints.

BACKGROUND OF THE INVENTION

Without limiting the scope of the invention, its background is described in connection with mechanical systems and methods for relieving a hip joint of weight to allow treatment of hip joint ailments.

U.S. Pat. No. 9,763,654, to Van Dyke, is said to disclose an orthopedic joint distractor that includes a stem post defining a pivoting axis, an actuator configured to cause translational movement of the stem post, a locking sleeve holding the actuator and the stem post, a distractor arc held by the locking sleeve orthogonally to the pivoting axis and having a surface, and a first locking member held by the locking sleeve that can be advanced away from and toward the surface. The first locking member is said to prevent rotation of the distractor arc about the pivoting axis when it has advanced a sufficient distance toward the surface.

U.S. Pat. No. 9,044,270, to Gabriel, et al., is said to disclose an apparatus and related method for controlling a load on a human hip joint during normal gait while preserving motion. The approach is intended to treat osteoarthritis of the hip without substantially resisting an angular displacement associated with full mobility of the pelvis and femur bones.

U.S. Patent Publication No. 2012/0046754, by Clifford, et al., is also said to disclose an apparatus and related method for controlling a load on a human hip joint during normal gait while preserving motion, an approach intended to treat osteoarthritis of the hip without substantially resisting an angular displacement associated with full mobility of the pelvis and femur bones.

U.S. Pat. No. 6,162,223, to Orsak, et al., is said to disclose a joint fixator apparatus that conforms to the natural axis of rotation of the joint in question, such as a patient's wrist or knee to avoid the possibility of bone fragment displacement and/or fracture reduction. The apparatus is said to include two fixation rod sections or shaft sections with a spring module therebetween. The spring module is said to be in the form of a flexible coupler that connects to respective ends of the external fixator rod. The patent is said to disclose that the module can include a removable clip to restrain the motion of the spring a desired amount such as before healing takes place; that the rods can be used to hold pin clamps which then hold bone pins for attachment to selected bones of the patient such as above and below a joint or above and below a fracture, and that the pin clamps can be moved along the rod sections to provide distraction of the joints for a ligamentotaxis effect in reducing the fracture.

Methods and systems for relieving or removing the weight from a hip joint are generally intrusive, painful, maintenance-intensive, or reduce or eliminate joint mobility. Methods and systems for off-loading hip joints that are not intrusive, painful, or maintenance intensive and which do not reduce or eliminate joint mobility are desirable.

SUMMARY OF THE INVENTION

In some embodiments of the disclosure, a hip-off-loading device is disclosed as including a pelvic assembly including: a pelvic base plate configured for attachment to a human pelvis; a distraction adjustment mechanism coupled to the pelvic base plate, wherein the distraction adjustment mechanism is lockable, to provide for adjusting the distal distraction of the hip-off-loading device; and at least a portion of a rotation mechanism to provide for internal or external rotation or both, and to provide for non-dynamic interoperative adjustment of abduction, adduction, or both; a link movably coupled to the pelvic assembly to provide for internal or external rotation or both; and a femoral assembly movably coupled to the link and including a femoral attachment mechanism for attachment to a femur to provide for flexion, extension, or both. In one aspect, the distraction mechanism of the pelvic assembly includes: a distraction post mounted on the pelvic base plate; and an adjustment screw threaded on the distraction post to provide for adjusting and setting the distraction of the hip-off-loading device; the at least a portion of the rotation mechanism of the pelvic assembly includes: at least one rotation mounting post mounted on the distraction post; an internal/external rotation rail coupled to the at least one mounting post, wherein the internal/external rotation rail is arc-shaped; and an internal/external rotation slider slidably coupled to the internal/external rotation rail, wherein the internal/external rotation slider includes a link attachment point; the link includes: an upper end including an upper attachment point rotatably and lockably coupled to the link attachment point of the pelvic assembly to provide for adjusting and setting an upper angle for the hip-off-loading; a threaded post coupled to the upper end of the link; an adjustment nut threaded onto the threaded post; a lower end coupled to the threaded post, including a lower attachment point; and the femoral assembly includes: a link attachment point rotatably and lockably coupled to the lower attachment point of the link to provide for a lower angle for the hip-off-loading device; and a flexion/extension arm rotatably coupled to the link attachment point, wherein the flexion/extension arm is coupled to the femoral attachment mechanism of the femoral assembly. In another aspect, the at least a portion of the rotation mechanism of the pelvic assembly includes: a rotational bearing coupled to the pelvic base plate; and a rotational slider rotationally coupled to the rotational bearing; and the distraction adjustment mechanism of the pelvic assembly includes a turnbuckle at a distal end of the rotational slider, wherein the turnbuckle is rotatably adjustable to adjust the distraction of the hip-off-loading device; the link includes: a downlink coupled to the turnbuckle, wherein the downlink includes an abduction/adduction slot, wherein the abduction/adduction slot is arc-shaped; and an abduction/adduction slider bearing slidably coupled to the abduction/adduction slot to provide for abduction, adduction, or both; and the femoral assembly includes: an abduction/adduction arm coupled to the abduction/adduction slider at an upper end of the abduction/ adduction arm; and a lower end of the abduction/adduction arm is rotatably coupled to the femoral attachment mechanism of the femoral assembly. In another aspect, the distraction mechanism of the pelvic assembly includes: a gear rack mounted through the pelvic base plate, including upper and lower rotational bearing surfaces; a worm drive engaged with the gear rack; a bevel gear engaged with the worm drive, wherein rotating the bevel gear turns the worm drive, which rotates the gear rack, moving the gear rack vertically; and an upper internal/external rotational bearing and a lower internal/external rotational bearing that engage the upper and lower rotational bearing surfaces of the gear rack, respectively, wherein the lower internal/external rotational bearing includes a link attachment point; the link includes: an upper end including an upper attachment point rotatably and lockably coupled to the link attachment point of the pelvic assembly to provide for adjusting and setting an upper angle for the hip-off-loading; a threaded post coupled to the upper end of the link; an adjustment nut threaded onto the threaded post; and a lower end coupled to the threaded post, including a lower attachment point; and the femoral assembly includes: a link attachment point rotatably and lockably coupled to the lower attachment point of the link to provide for adjusting a lower angle for the hip-off-loading device; a flexion/extension arm rotatably coupled to the link attachment point, wherein the flexion/extension arm is coupled to the femoral attachment mechanism of the femoral assembly. In another aspect, the distraction mechanism of the pelvic assembly includes: an adjustment screw mounted through the pelvic base plate; a translation shuttle engaged with the adjustment screw, including a spherical seat; the link includes: a linear adjustment downlink with a spherical surface that engages the spherical seat of the pelvic assembly; a superior downlink coupled to the linear adjustment downlink; an inferior downlink engaged with the superior downlink; and a spherical seat; and the femoral assembly includes: a spherical surface that engages the spherical seat of the link; and a flexion/extension arm rotatably coupled to the link attachment point, wherein the flexion/extension arm is coupled to the femoral attachment mechanism of the femoral assembly. In another aspect, the femoral attachment mechanism is a lateral plate or a femoral component configured to be installed in an intramedullary canal. In another aspect, the hip-off-loading device includes titanium, stainless steel, spring steel, niobium, carbon fiber, ceramics, polymers, composites, or some combination. In another aspect, the pelvic assembly, the link, or the femoral assembly, or some combination, is adjustable to accommodate patient-specific anatomies.

In some embodiments of the disclosure, a kit is disclosed as including a hip-off-loading device including: a pelvic assembly including: a pelvic base plate configured for attachment to a human pelvis; a distraction adjustment mechanism coupled to the pelvic base plate, wherein the distraction adjustment mechanism is lockable, to provide for adjusting the distal distraction of the hip-off-loading device; and at least a portion of a rotation mechanism to provide for internal or external rotation or both; a link movably coupled to the pelvic assembly to provide for internal or external rotation or both; and a femoral assembly coupled to the link and including a femoral attachment mechanism for attachment to a femur to provide for flexion, extension, or both. In one aspect, the femoral attachment mechanism is a lateral plate or an intramedullary rod. In another aspect, hip-off-loading device includes titanium, stainless steel, spring steel, aluminum, niobium, carbon fiber, ceramics, polymers, composites, or some combination. In another aspect, the pelvic assembly, the link, or the femoral assembly, or some combination, is adjustable to accommodate patient-specific anatomies.

In some embodiments of the disclosure, a method of providing hip-off-loading is disclosed as including providing a patient requiring hip-off-loading; and fastening a hip-off-loading device to a pelvis and to a femur of the patient, the hip-off-loading device including: a pelvic assembly including: a pelvic base plate configured for attachment to a human pelvis; a distraction adjustment mechanism coupled to the pelvic base plate, wherein the distraction adjustment mechanism is lockable, to provide for adjusting the distal distraction of the hip-off-loading device; and at least a portion of a rotation mechanism to provide for internal or external rotation or both; a link movably coupled to the pelvic assembly to provide for internal or external rotation or both; and a femoral assembly coupled to the link and including a femoral attachment mechanism for attachment to a femur to provide for flexion, extension, or both. In one aspect, the femoral attachment mechanism is a lateral plate or an intramedullary rod. In another aspect, the hip-off-loading device includes titanium, stainless steel, spring steel, niobium, carbon fiber, ceramics, polymers, composites, or some combination. In the another aspect, the method further includes adjusting the pelvic assembly, the link, or the femoral assembly, or some combination, to accommodate one or more anatomical features specific to the patient.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 14:
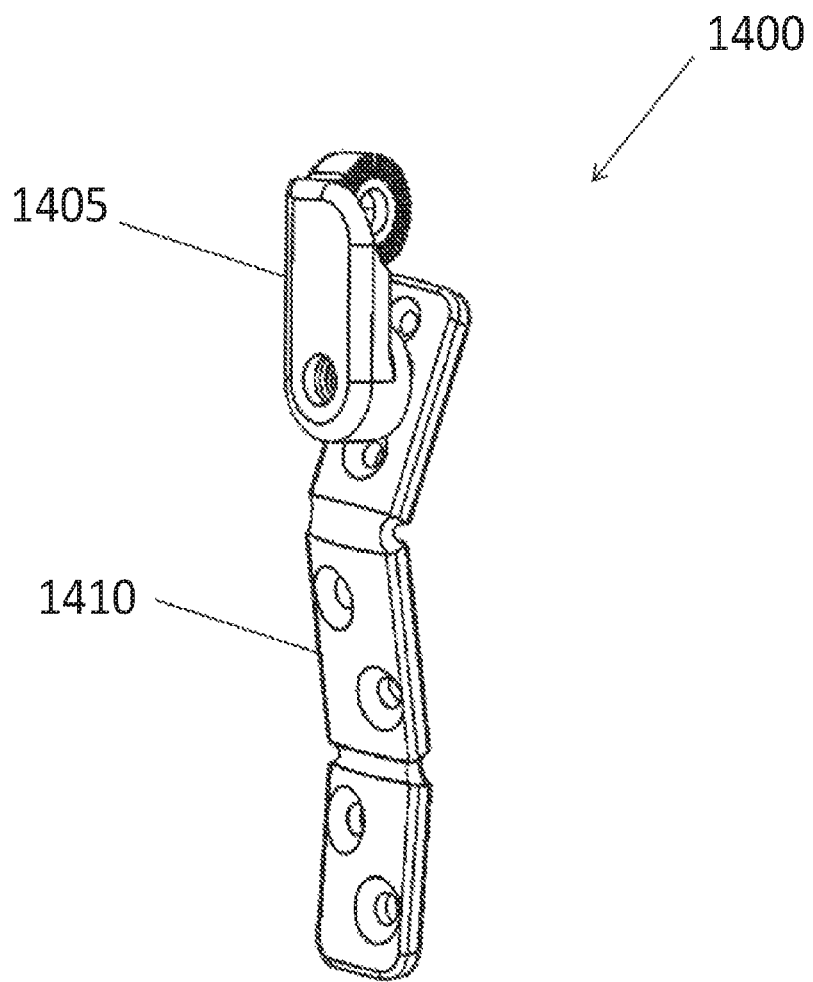
FIG. 14 shows the femoral assembly.
Figure 15:
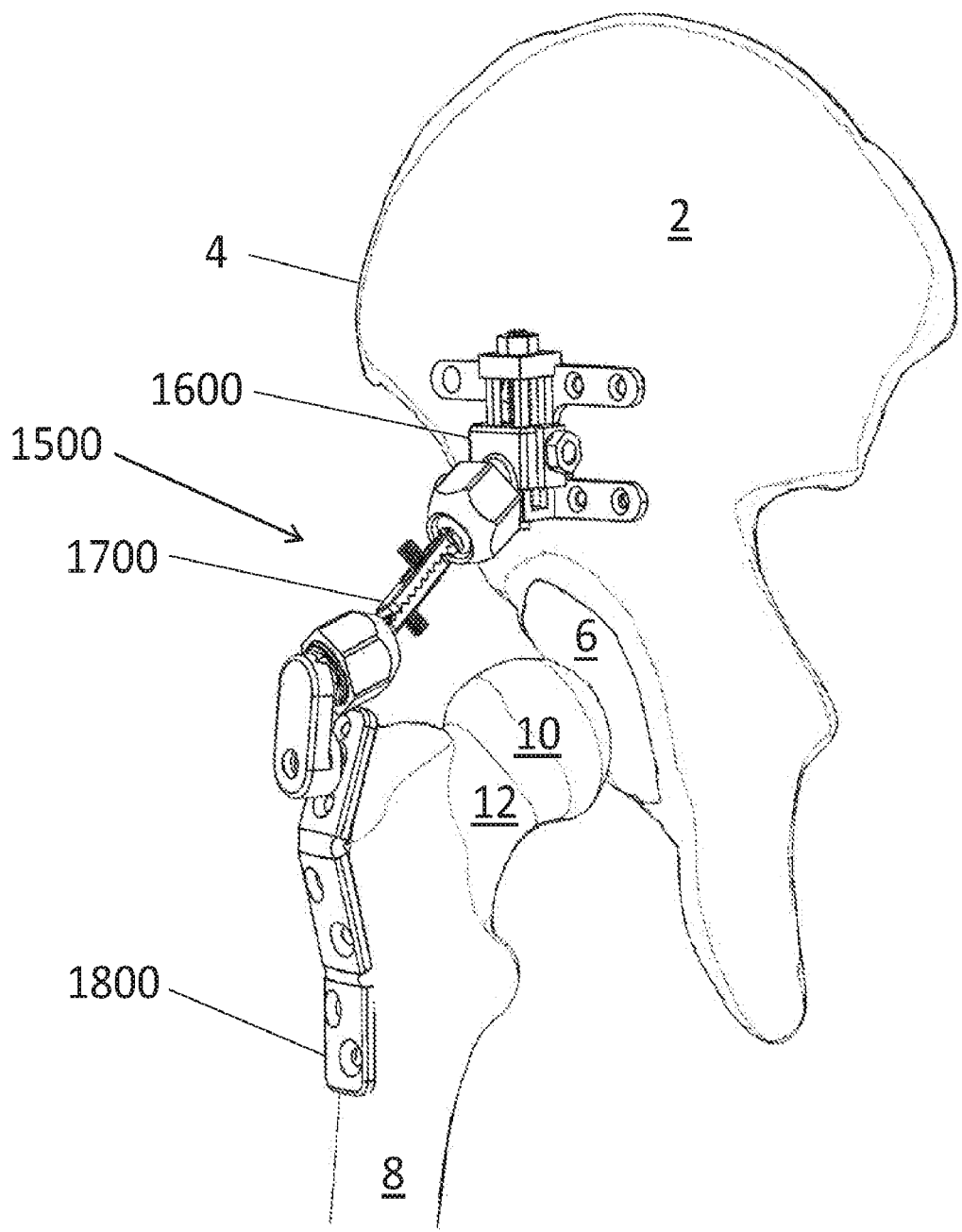
FIG. 15 shows a perspective view of yet another embodiment of the present invention.
Figure 16:
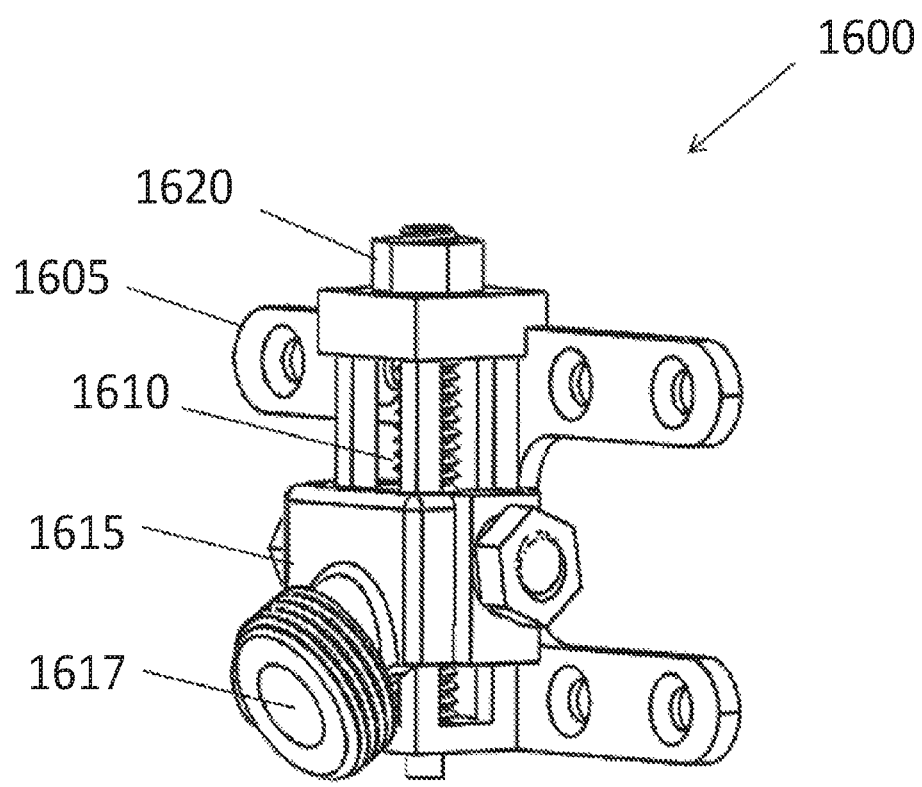
FIG. 16 shows a detail view of the pelvic assembly.
Figure 17:
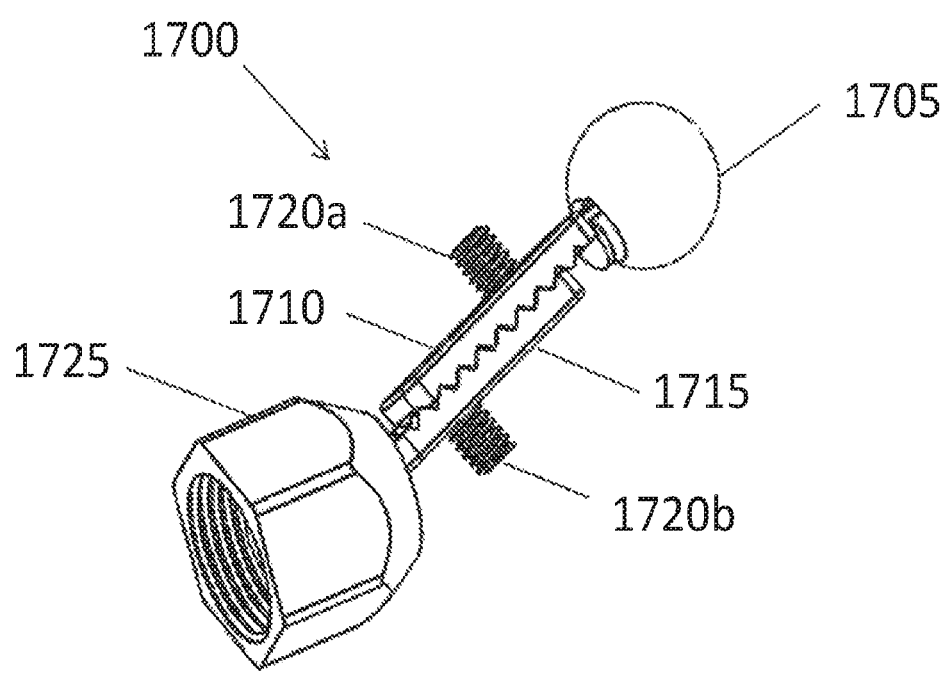
FIG. 17 shows a detail of the abduction/adduction adjustment link.

FIGS. 1-17 illustrate various embodiments of the present invention: hip-off-loading device 100 (FIGS. 1-5); hip-off-loading device 500 (FIGS. 6-9); hip-off-loading device 1000 (FIGS. 10-14); and hip-off-loading device 1500 (FIGS. 15-17). While distinct embodiments with distinct features are illustrated and described, one or more aspects of the illustrated and described embodiments may be combined to construct other embodiments of the present invention. The various embodiments share at least these common aspects: a pelvic assembly including a pelvic base plate configured for attachment to a human pelvis; a distraction adjustment mechanism coupled to the pelvic base plate, wherein the distraction adjustment mechanism is lockable, to provide for adjusting the distal distraction of the hip-off-loading device, and at least a portion of a rotation mechanism to provide for internal or external rotation or both, and to provide for non-dynamic interoperative adjustment of abduction, adduction, or both; a link movably coupled to the pelvic assembly to provide for internal or external rotation or both; and a femoral assembly movably coupled to the link and including a femoral attachment mechanism for attachment to a femur to provide for flexion, extension, or both.

Figure 1:
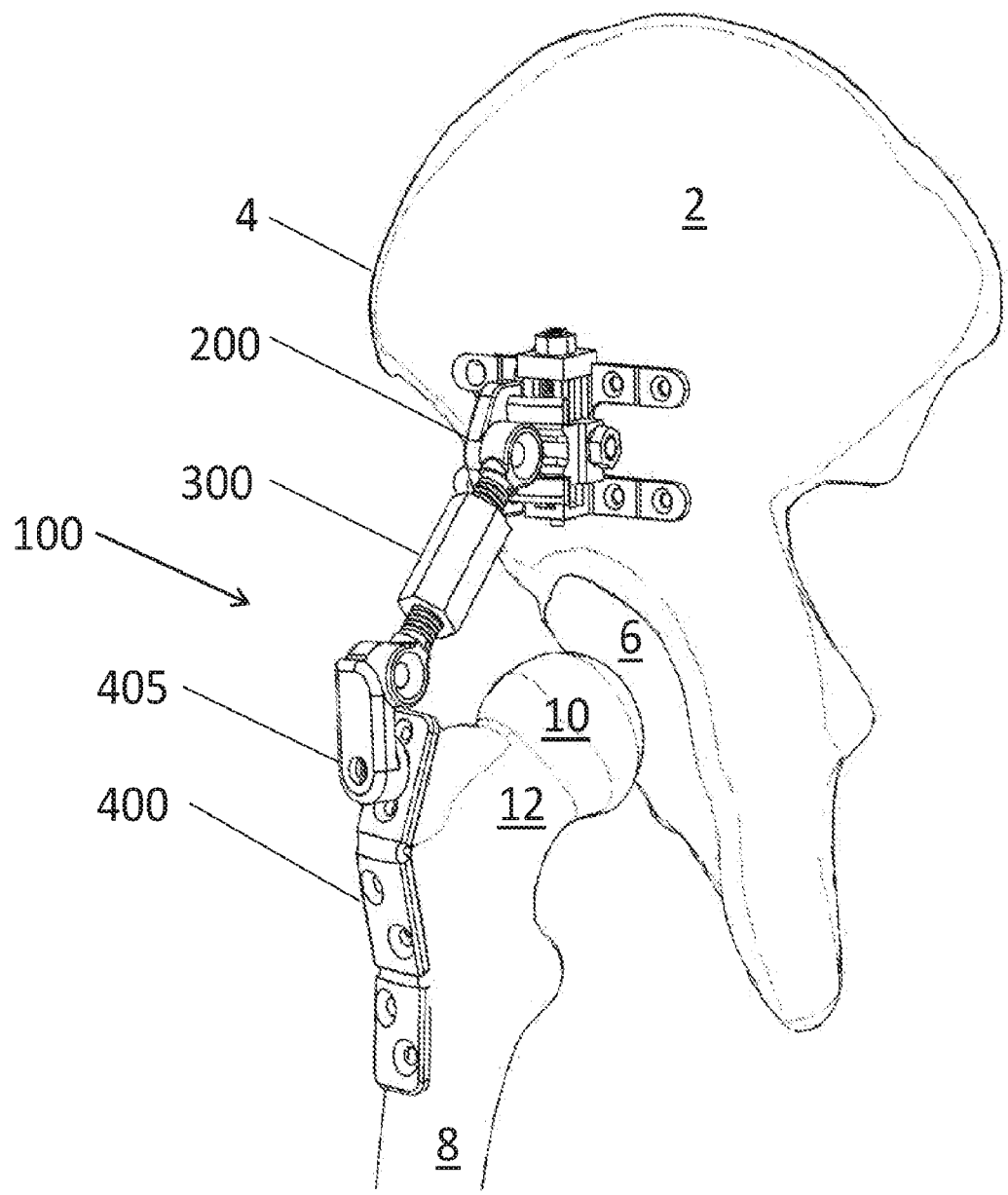
FIG. 1 shows a perspective view of an embodiment of the present invention, a hip off-loading device.

FIG. 1 shows a perspective view of an embodiment of the present invention which off-loads a human hip joint while preserving motion in flexion/extension or internal/external rotation, or both. The embodiment, hip-off-loading device 100, is shown in position relative to a human pelvis 2 with iliac crest 4 and acetabulum 6 and a human femur 8 with femoral head 10 and femoral neck 12. The hip off-loading device includes the pelvic assembly 200, the link 300, and the femoral assembly 400. The pelvic assembly 200 is attached to the iliac crest 4 of the pelvis 2 just above the acetabulum 6 with fasteners such as, e.g., bone screws (not depicted). The pelvic assembly 200 provides inferior or superior adjustment to accommodate patient-specific anatomy; distal distraction for the off-loading of the femoral head 10 within the acetabulum 6; and internal or external rotation of the hip joint. Link 300 is coupled to the pelvic assembly 200 at one end of the link 300. Link 300 is adjustable to permit angular adjustment for different angles of femoral neck 12 in different patients; and to provide for non-dynamic interoperative adjustment of abduction, adduction, or both, where "non-dynamic . . . adjustment" refers to adjusting abduction, adduction, or both then locking the mechanism in place, and where "interoperative adjustment" refers to adjustment during an operation for installing or adjusting the hip off-loading device. Link 300 is also adjustable in length to accommodate patient-specific anatomy and patient growth. The opposite end of the link 300 is coupled to the femoral assembly 400. The femoral assembly 400 can be attached to the femur 8 with fasteners such as, e.g., bone screws (not depicted), and/or the flexion/extension arm 405 can be attached rotatably to a post (not shown) of an intramedullary rod (not shown) installed in the femur 8, without use of a lateral plate (which may also be called the femoral plate 410 herein).

Figure 2:
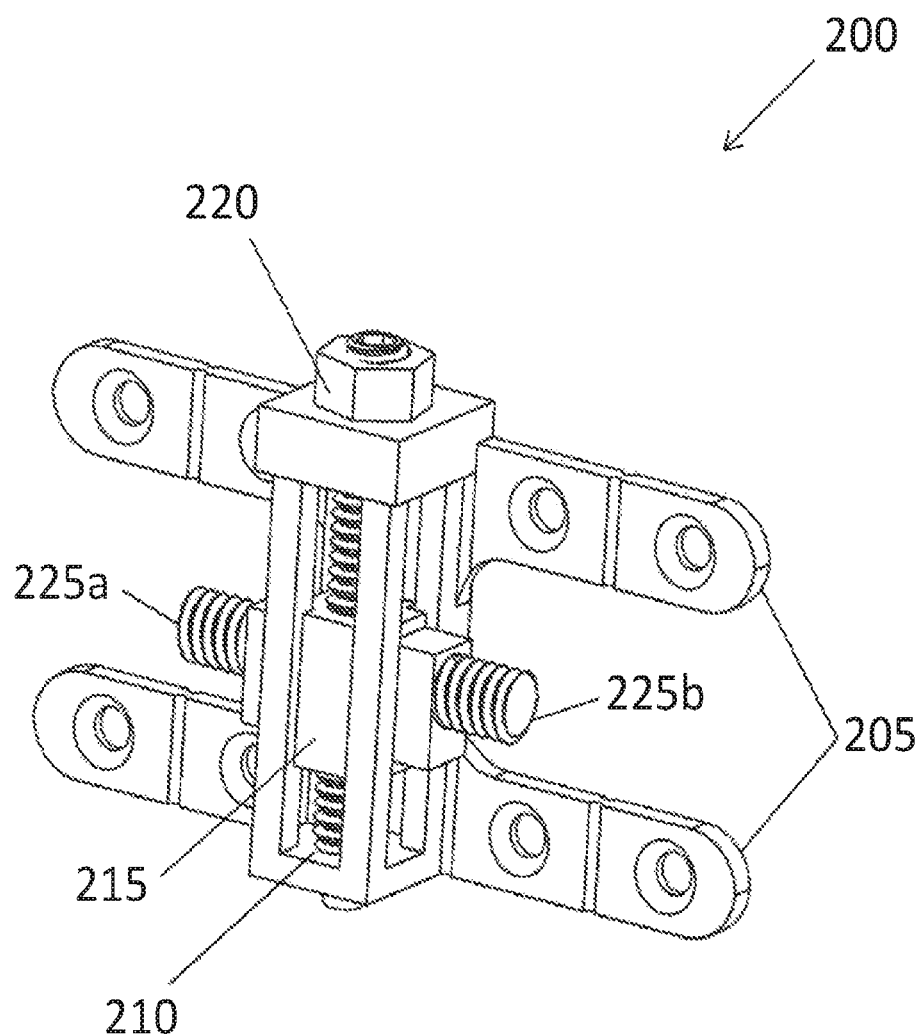
FIG. 2 shows the pelvic assembly in an embodiment of the present invention.

FIG. 2 shows one example of the pelvic assembly 200 of the present invention. The pelvic base plate 205 attaches to the pelvis 2 with fasteners such as bone screws. The mounting holes of the pelvic base plate 205 may be contoured by the surgeon installing the hip-off-loading device 100 to fit the patient's anatomy for secure attachment. An adjustment screw 210 is centrally mounted on the pelvic base plate 205. The adjustment screw 210 is threaded through the distraction post 215. Rotation of the adjustment screw 210 drives the distraction post 215 proximally and distally to adjust the amount of distal distraction applied to the femur 8 (not shown) relative to the acetabulum 6 (not shown). A locking nut 220 threaded on top of the adjustment screw 210 to lock the rotation of the adjustment screw 210 for the desired distraction. Threaded posts 225a and 225b are also shown.

Figure 3:
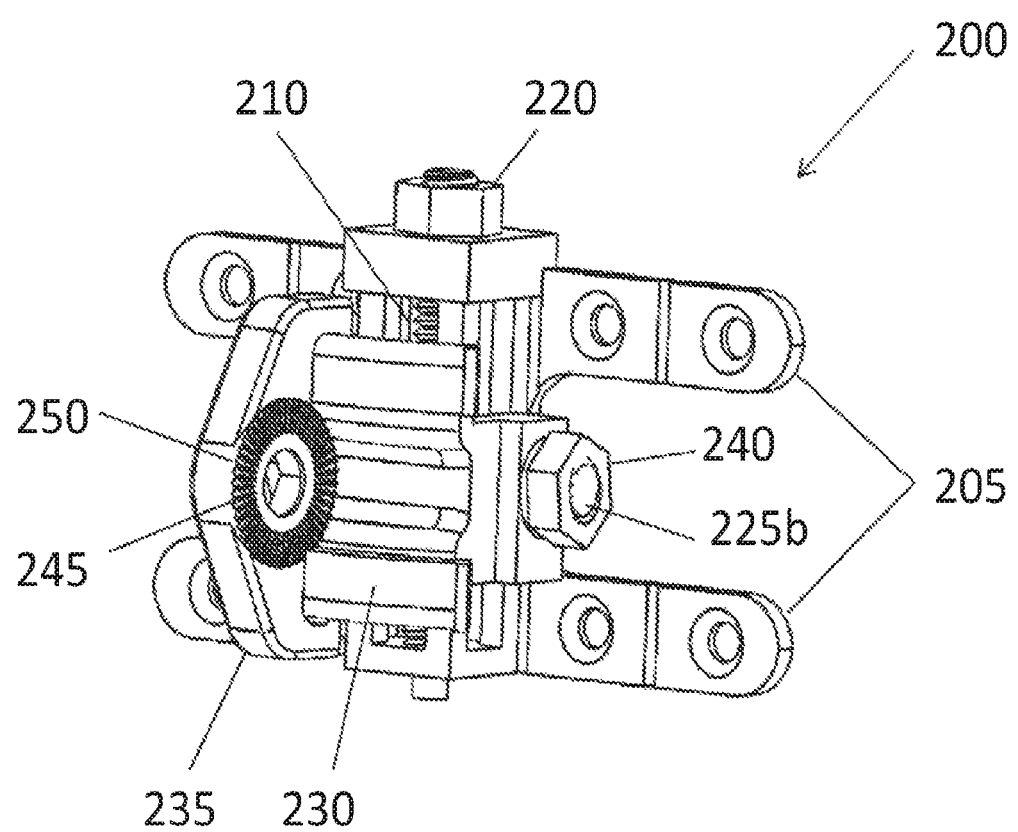
FIG. 3 shows the pelvic assembly with an internal/external rotation rail and an internal/external rotation slider in place.

FIG. 3 shows an example of the pelvic assembly 200 with the internal/external rotation rail 230 and the internal/external rotation slider 235 in place. The internal/external rotation rail 230 attaches to the distraction post 215 (see FIG. 2) via threaded posts 225a (not shown) and 225b and is secured in place using locking nuts, of which one, locking nut 240, is shown. The internal/external rotation slider 235 rides on an arc created by the internal/external rotation rail 230. The upper end of the link 300 (see FIG. 4) attaches to the internal/external rotation slider 235 at link attachment point 245 with a fastener such as, e.g., a screw. The internal/external rotation slider 235 has radially arrayed teeth 250 at the attachment point 245 that lock the angle of the upper end of link 300 (not shown) at the desired link angle. Adjustment screw 210 is also shown.

Figure 4:
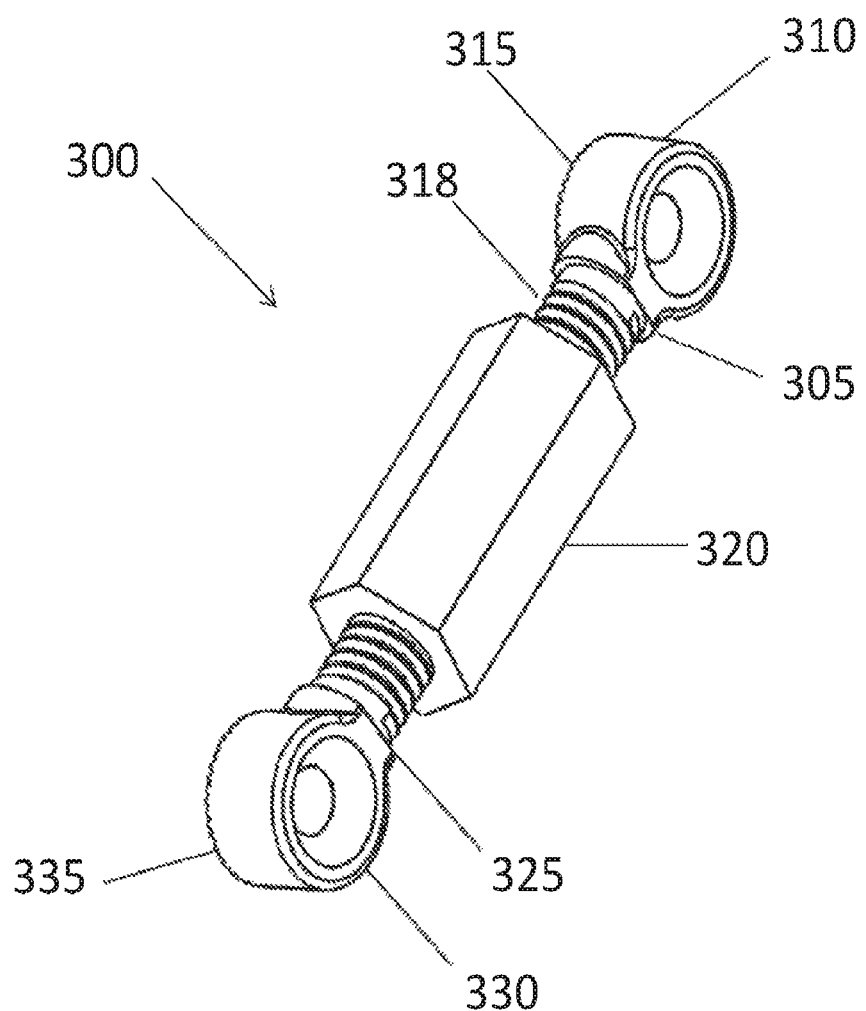
FIG. 4 shows the link in an embodiment of the present invention.

FIG. 4 shows a link 300 for use with the present invention. The upper end 305 of the link 300 includes the upper attachment point 310 and radially arrayed teeth 315. The upper attachment point 310 attaches to the link attachment point 240 of the pelvic assembly 200 (see FIG. 3). The radially arrayed teeth 315 and the radially arrayed teeth 250 of the pelvic assembly (see FIG. 3) engage to prevent rotation when an attachment fastener (not shown) is tightened. The upper end 305 is threaded into the upper end of a threaded post 318, and the lower end 325 of the link 300 is threaded into the lower end of the threaded post 318. A nut 320 is threaded onto the threaded post 318 such that rotation of the nut 320 lengthens or shortens the link 300. The lower end 325 of link 300 includes the lower attachment point 330 has radially arrayed teeth 335 that engage a link attachment point on the femoral assembly 400 (see FIG. 5).

Figure 5:
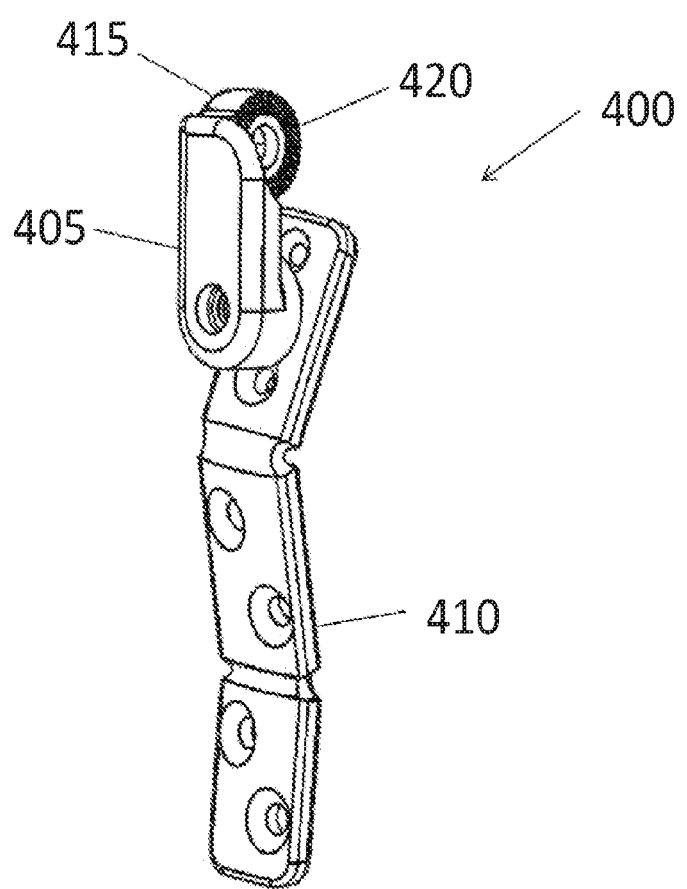
FIG. 5 shows the femoral assembly in an embodiment of the present invention.

FIG. 5 shows an example of the femoral assembly 400 of the present invention. The femoral assembly 400 includes the flexion/extension arm 405 and a femoral attachment mechanism that may include the lateral plate 410. The flexion/extension arm 405 attaches to the lower attachment point 330 of link 300 (see FIG. 4) at attachment point 415, which has radially arrayed teeth 420 to engage the radially arrayed teeth 335 of the lower attachment point 330 of link 300. The flexion/extension arm 405 can be attached rotatably to a post (not shown) of the lateral plate 410 to provide flexion and extension of the hip about the centroid of the femoral head 10 (not shown). The lateral plate 410 can be attached to the femur 8 (not shown) with fasteners such as bone screws, or the femoral attachment mechanism may include an intramedullary rod (not shown), and the flexion/extension arm 405 can be attached rotatably to a post (not shown) of the intramedullary rod installed in the femur 8 (not shown), without use of the lateral plate 410.

Figure 6:
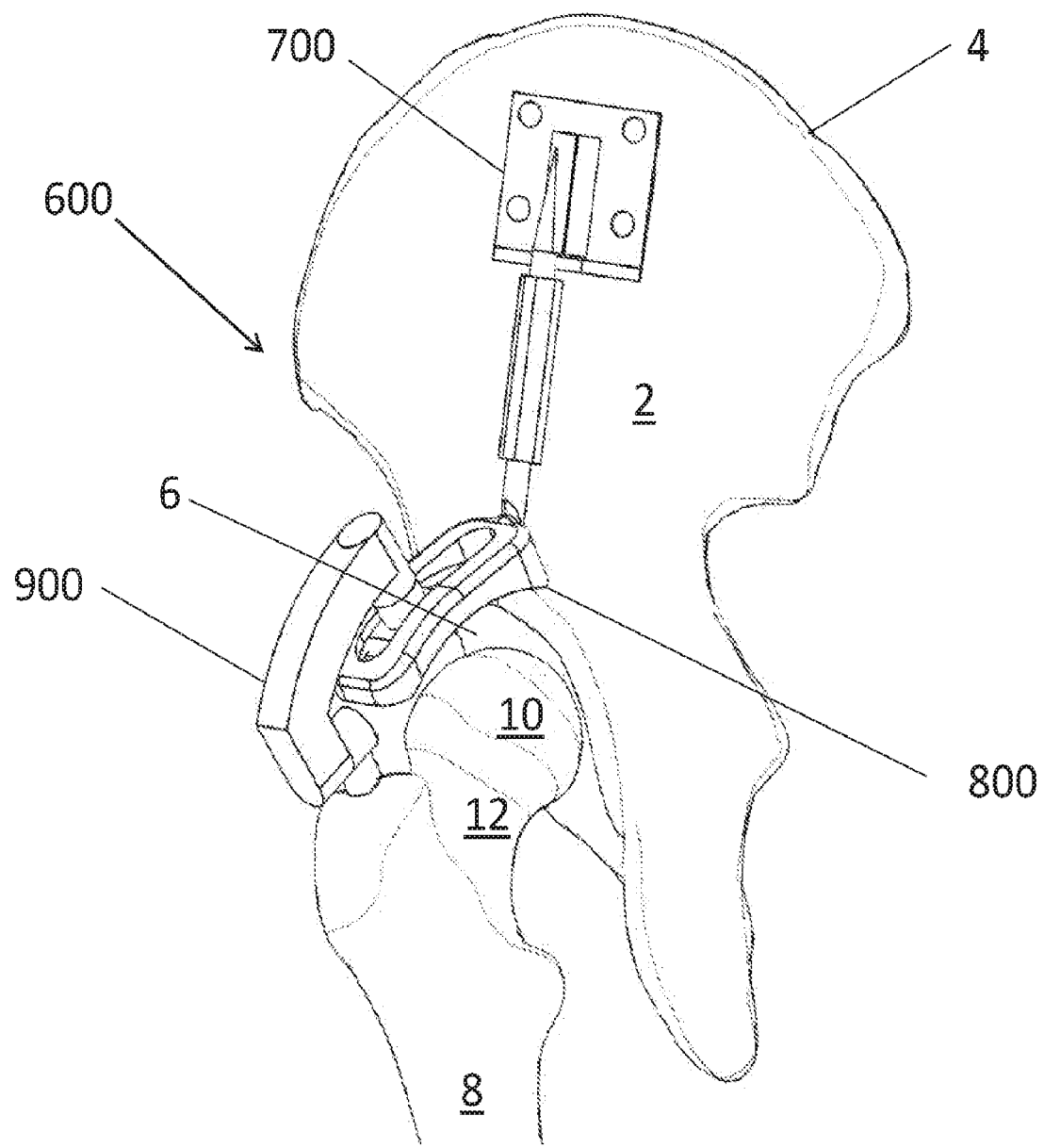
FIG. 6 shows a perspective view of another embodiment of the present invention.

FIG. 6 shows a perspective view of another embodiment of the present invention, which off-loads a human hip joint while preserving motion in flexion/extension, internal/external rotation, or abduction/adduction, or some combination. In this embodiment, hip-off-loading device 600 includes a pelvic assembly 700 which is attached to the iliac crest 4 of the pelvis 2 directly above the acetabulum 6 of the hip. The pelvic assembly 700 may be fastened using, e.g., bone screws. The pelvic assembly 700 also provides for internal/external rotation of the hip joint and is oriented such that the axis of internal/external rotation is through the centroid of the femoral head 10 of the femur 8. Attached to the pelvic assembly 700 is an abduction/adduction assembly 800 which swings about an arc centered on the femoral head 10 of the femur 8. Distal to the abduction/adduction assembly 800 is the femoral assembly 900 which secures the abduction/adduction assembly to the femur 8. The femoral assembly 900 includes a rotational joint which permits flexion and extension of the femur 8 relative to the acetabulum 6. Also shown is femoral neck 12.

Figure 7:
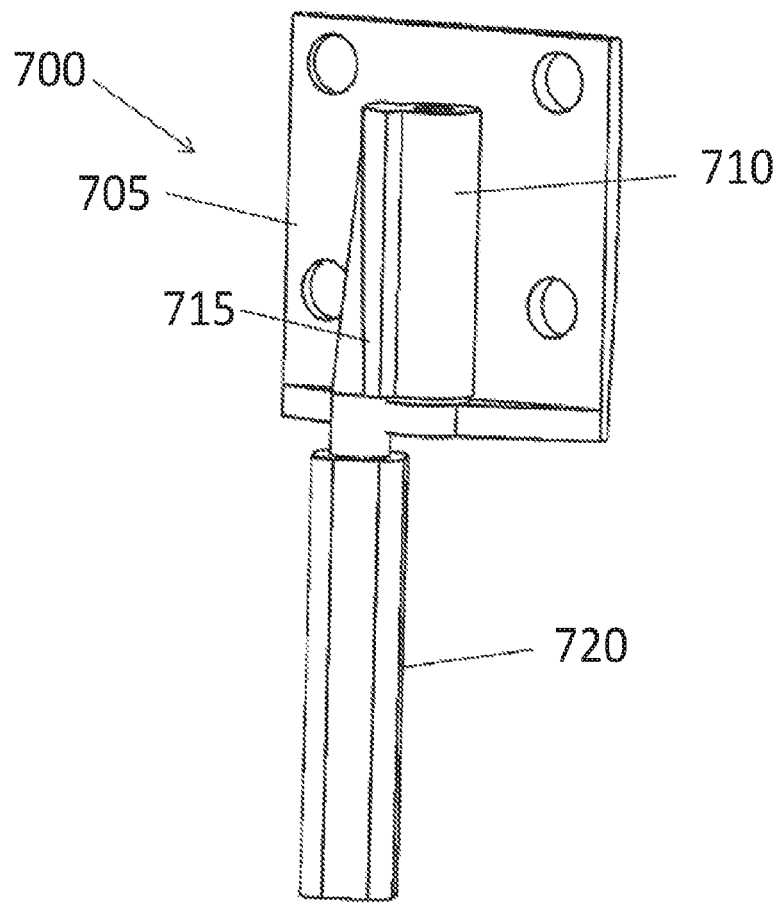
FIG. 7 shows a detail view of the pelvic assembly.

FIG. 7 shows a detail view of the pelvic assembly 700. The pelvic base plate 705 attaches to the iliac crest 4 (not shown) with, e.g., bone screws. Centrally mounted through the pelvic base plate 705 is a rotational bearing 710 which is centered about the femoral head 10 (not shown) to provide internal/external rotation of the hip. Attached to the rotational bearing 710 is a rotational slider 715 which rotationally engages the rotational bearing 710. On the distal end of the rotational slider 715 is an adjustable turnbuckle 720 which can be turned to distally lengthen the pelvic assembly 700 to match the anatomy and to provide distal distraction to the hip joint.

Figure 8:
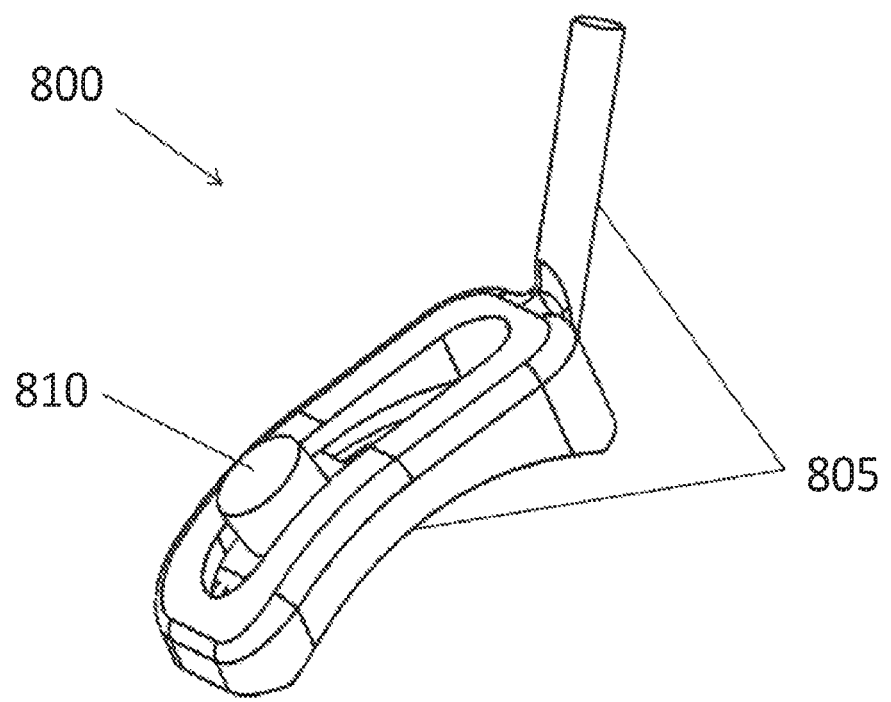
FIG. 8 shows a detail view of the abduction/adduction assembly with the downlink that engages the turnbuckle.

FIG. 8 shows a detail view of the abduction/adduction assembly 800 with the downlink 805 that engages the turnbuckle 720 in FIG. 7. The downlink 805 provides a rotational arc, centered about the femoral head 10 (not shown) and houses the abduction/adduction slider bearing 810 within it. The abduction/adduction slider bearing 810 is permitted to move through the arc provided by the downlink 805.

Figure 9:
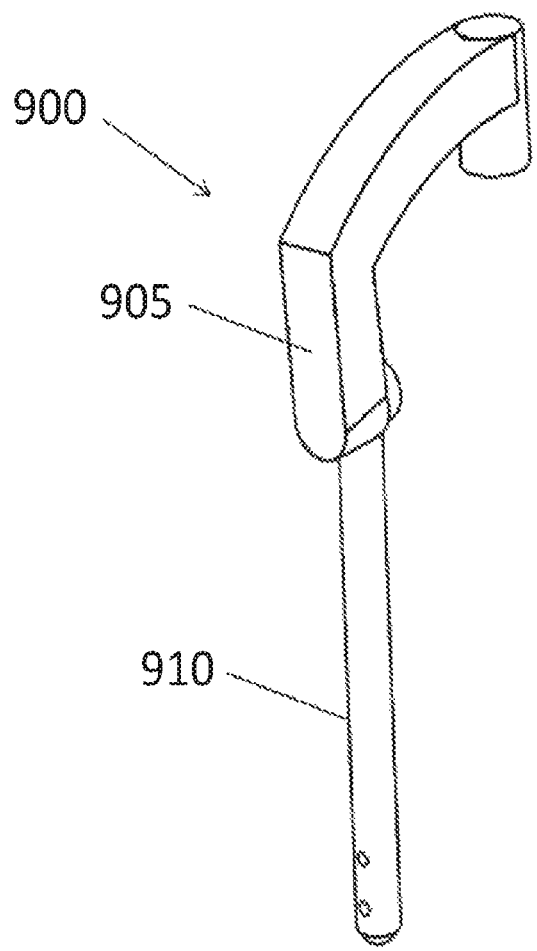
FIG. 9 shows a detail view of the femoral assembly.

FIG. 9 shows a detail view of the femoral assembly 900. The upper portion of the abduction/adduction arm 905 attaches to the abduction/adduction slider bearing 810 (see FIG. 8) using a screw. The lower portion of the abduction/adduction arm 905 attaches to a femoral attachment mechanism, which may include a femoral component 910 using a cylindrical mating attachment and bearing which provide rotation about the flexion/extension axis. The femoral component 910 is inserted into the intramedullary canal (not shown) and secured rotationally within the intramedullary canal, using screws positioned normal to the femoral axis of femur 8 (not shown). The femoral attachment mechanism may alternatively include a lateral plate (not shown) similar or identical to lateral plate 410, and the abduction/adduction arm 905 may alternatively rotatably attach to the lateral plate, which can be attached to the femur 8 (not shown) with fasteners such as bone screws.

Figure 10:
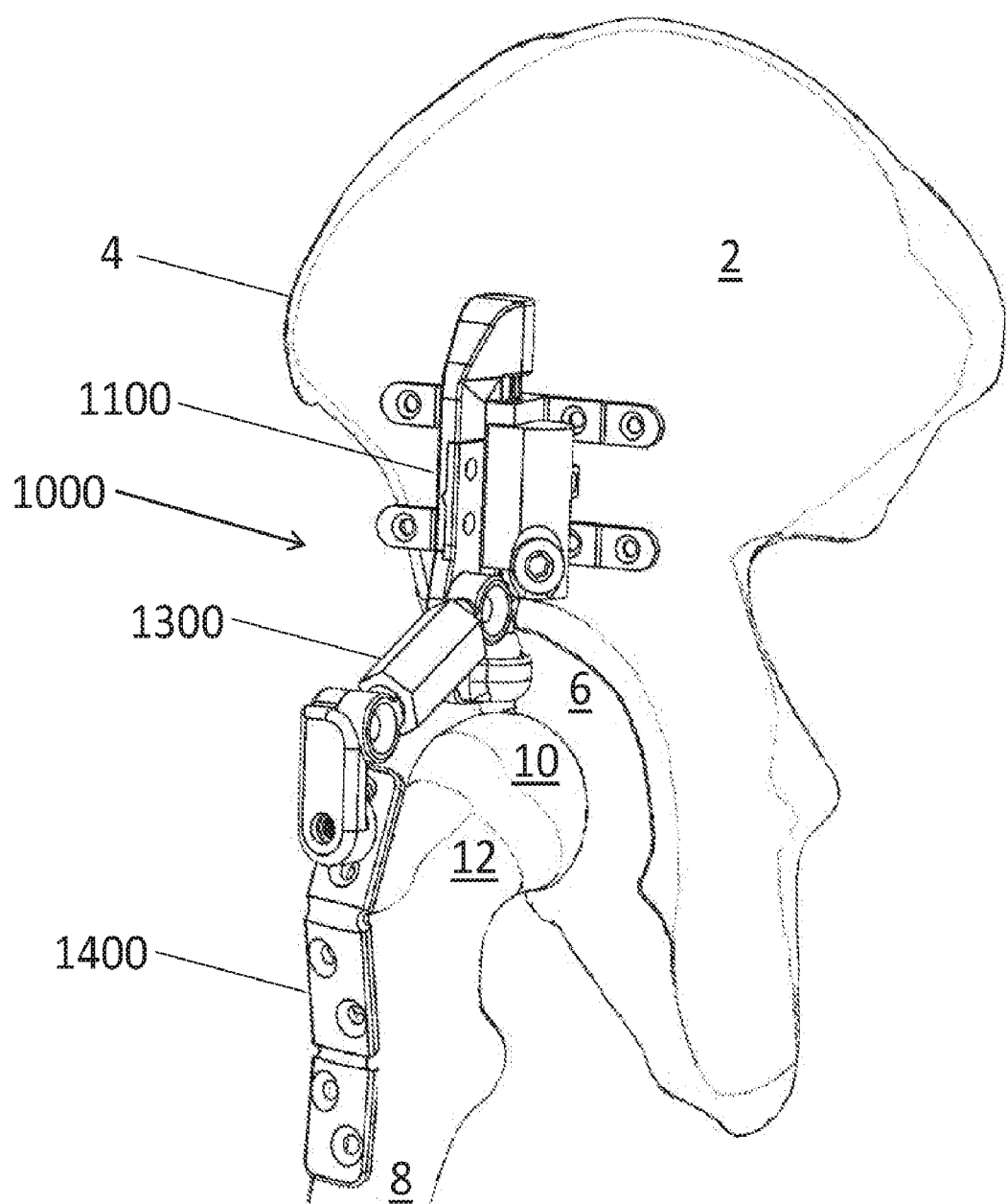
FIG. 10 shows a perspective view of yet another embodiment of the present invention.

FIG. 10 shows a perspective view of yet another embodiment of the present invention, which off-loads a human hip joint while preserving motion in flexion/extension, internal/external rotation, or abduction/adduction, or some combination. In this embodiment, hip-off-loading device 1000 includes a pelvic assembly 1100, an adjustable link 1300, and a femoral assembly 1400. The hip-off-loading device 1000 is shown in position relative to human pelvis 2 with iliac crest 4 and acetabulum 6 and a human femur 8 with femoral head 10 and femoral neck 12. The pelvic assembly 1100 is attached to the iliac crest 4 of the pelvis 2 just above the acetabulum 6 with fasteners such as, e.g., bone screws (not depicted). The adjustable link 1300 is coupled to the pelvic assembly at one end of the link 1300 and the opposite end is coupled to the femoral assembly 1400. The femoral assembly 1400 is attached to the shaft of the femur 8 using bone screws (not shown) and is able to be contoured to match patient anatomy. Alternatively, the femoral assembly 1400 could be attached to the femur 8 with an intramedullary rod (not shown) in the intramedullary canal, held in place with a bone screw.

Figure 11:
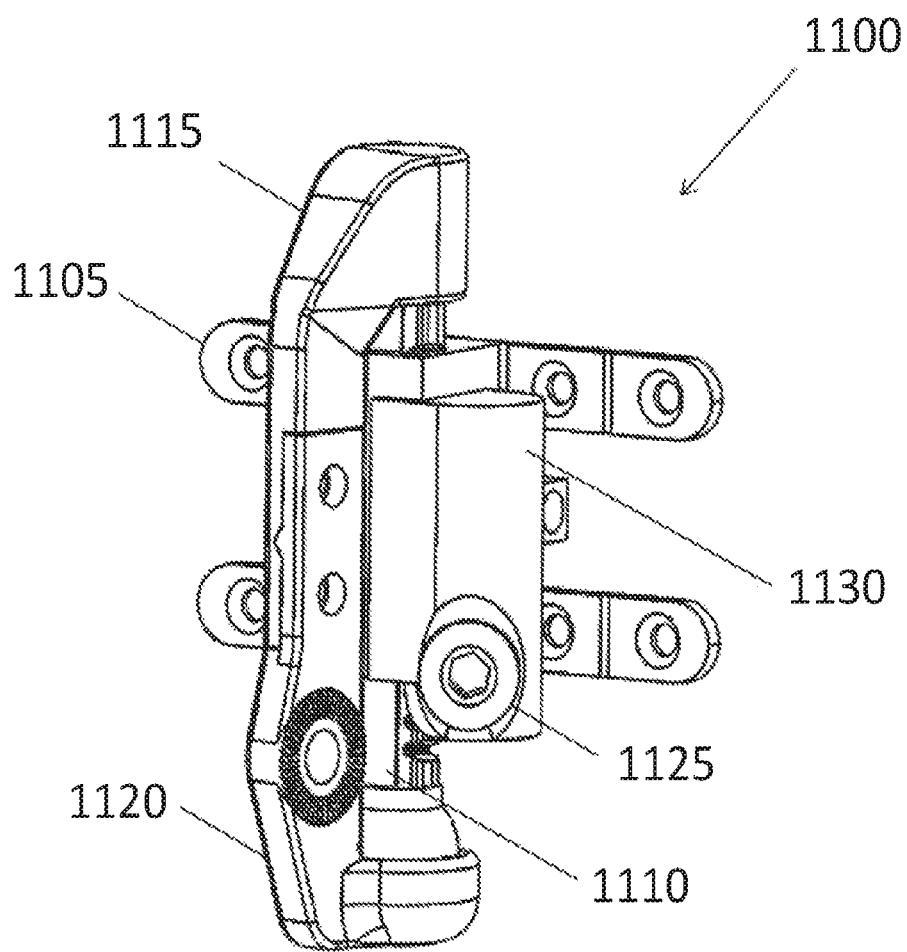
FIG. 11 shows a detail view of the pelvic assembly.

FIG. 11 shows a detail view of the pelvic assembly 1100. The pelvic base plate 1105 attaches to the pelvic bone via bone screws (not shown). The pelvic plate mounting holes are able to be contoured by the surgeon in order to match up to patient anatomy for secure attachment. Centrally mounted through the pelvic base plate 1105 is a gear rack 1110 which has rotational bearing surfaces at either end to engage the upper internal/external rotational bearing 1115 and lower internal/external rotational bearing 1120. Rotation of the bevel gear 1125 drives a worm drive (not shown) which is engaged with the rack gear 1110 and thereby drives the rack gear 1110 both proximally and distally, at surgeon discretion, in order to both fit patient anatomy and also to provide adjustable distraction of the femur 8 relative to the iliac 4 (not shown). A gearbox cover 1130 encloses the worm drive and the bevel gear and keeps them in proper relationship to one another. The upper and lower internal/external rotation bearings, 1115 and 1120, respectively, permit the femur 8 to rotate both internally and externally about the centroid of the femoral head 10 (not shown).

Figure 12:
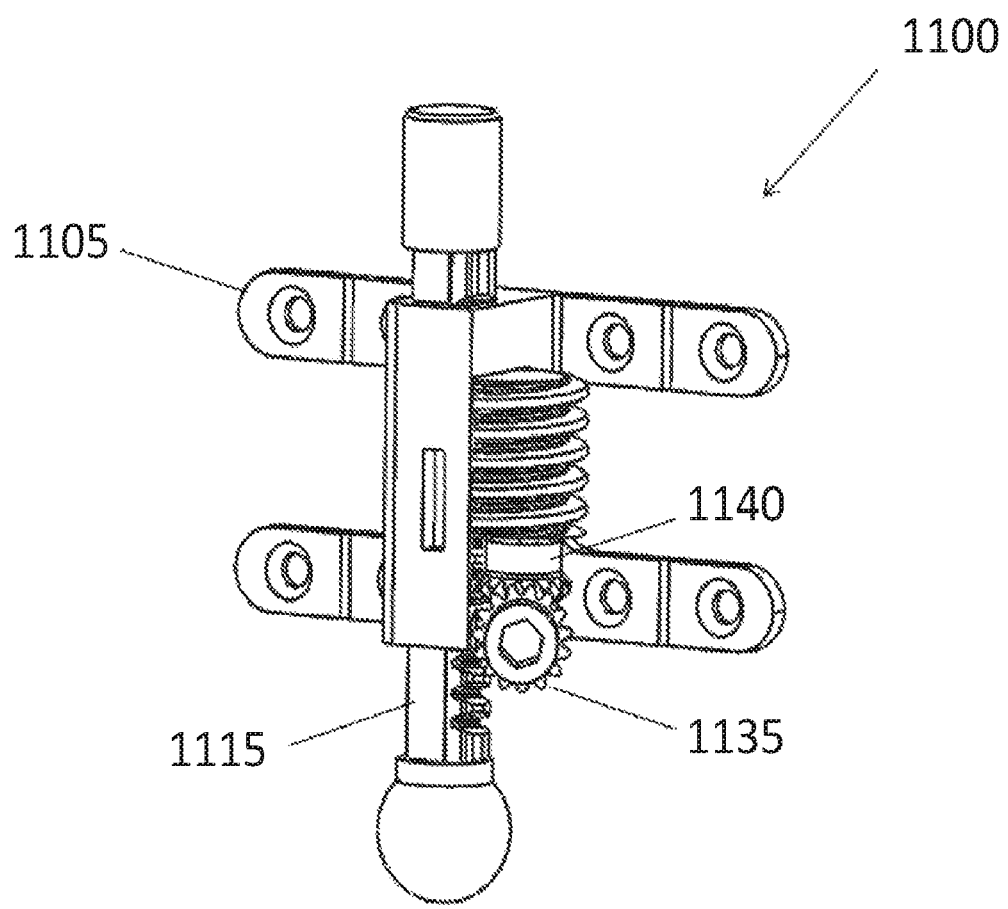
FIG. 12 shows another detail view of the pelvic assembly.

FIG. 12 shows another detail view of the pelvic assembly 1100, with the upper and lower internal/external rotation bearings 1115 and 1120 and gearbox cover 1130 (not shown) removed. The surgeon may drive the bevel gear 1125 which drives the worm drive 1140. Actuation of the worm drive 1140, drives the rack gear 1110 both proximally and distally for both joint distraction and to accommodate unique patient anatomy. An advantage of the pelvic assembly 1100 is that anatomical loads placed on the worm drive 1140 cannot drive the move the rack gear 1110 up or down.

Figure 13:
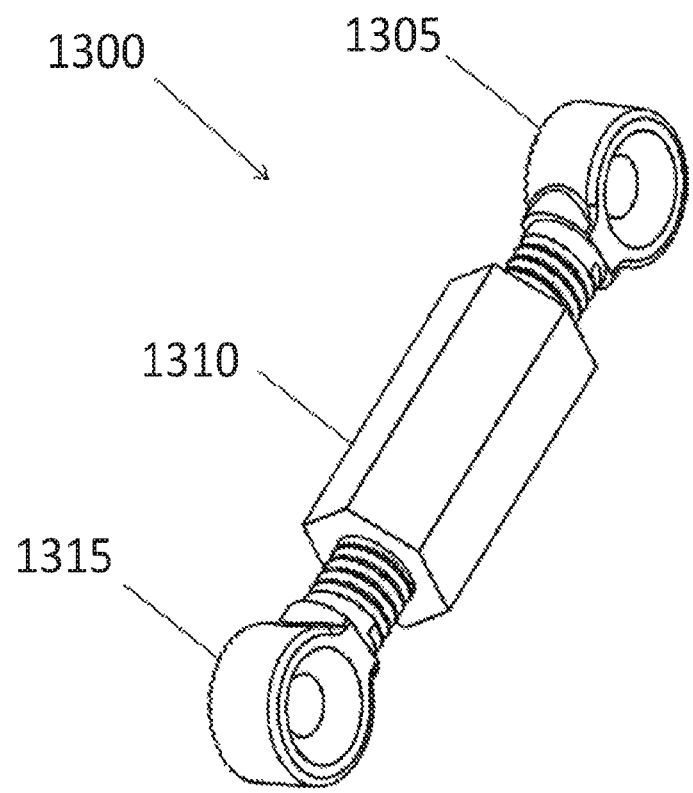
FIG. 13 shows a detail of the adjustable link.

FIG. 13 shows a detail of the adjustable link 1300, which connects the pelvic assembly 11 to the femoral assembly 1400 (see FIG. 1400). The upper link 1305 attaches the lower internal/external bearing 1120 via screw. The opposing faces have radially arrayed teeth which prevent rotational translation once the screw is tightened. The distal end of the upper link 1305 is threaded into a female nut 1310 which has both right-handed and left-handed threads so that when it is turned the upper link 1305 and lower link 1315 can be drawn together simultaneously or pushed apart thereby shortening or lengthening the assembly. The lower link 1315 has radially arrayed teeth which prevent rotational movement when secured using a screw through the center. The angulation of the upper link 1305 and lower link 1315 can be adjusted to match the patient specific angle of the femoral neck and then locked into place by tightening the locking screws through the holes in the upper link 1305 and lower link 1315. Patient adduction and abduction may be fixed using this method as well.

FIG. 14 shows the femoral assembly 1400. The upper portion of the flexion/extension arm 1405 attaches to the lower link 1315 (see FIG. 13) using a screw. The flexion/extension arm 1405 has a female, cylindrical receptacle which mates with and rotates around the male post of a femoral attachment mechanism, which may include the lateral plate 1410. The rotation of the flexion/extension arm 1405 about the post of the lateral plate provides for flexion and extension of the hip about the centroid of the head of the femur 10 (not shown). The lateral plate 1410 is attached to the shaft of the femur using bone screws (not shown) and is able to be contoured to match patient anatomy. Alternatively, the femoral attachment mechanism may include an intramedullary rod (not shown) which then attaches to the flexion/extension arm 1405 in the same manner.

FIG. 15 shows a perspective view of yet another embodiment of the present invention, which off-loads a human hip joint while preserving motion in flexion/extension, internal/external rotation, or abduction/adduction, or some combination. In this embodiment, hip-off-loading device 1500 includes a pelvic assembly 1600, an abduction/adduction adjustment assembly 1700, and a femoral assembly 1800. The pelvic assembly 1600 is attached to the iliac crest 4 of the pelvis 2 directly above the acetabulum 6 of the hip. This assembly may be fastened using bone screws (not shown). It also provides superior/inferior adjustment. Attached to the pelvic assembly 1600 is the abduction/adduction adjustment link 1700 which is able to pivot about opposed ball joints within the abduction/adduction adjustment assembly 1700 as well as lengthen and contract along its length parallel to the femoral neck 12. Distal to the abduction/adduction adjustment assembly 1700 is the femoral assembly 1800 which secures the abduction/adduction assembly to the femur 8. The femoral assembly includes a rotational joint which permits flexion and extension of the femur 8, relative to the acetabulum 6 of the pelvis 2.

FIG. 16 shows a detail view of the pelvic assembly 1600. The pelvic base plate 1605 attaches to the pelvic bone via bone screws (not shown). Centrally mounted through the pelvic base plate 1605 is an adjustment screw 1610 which is used to adjust the translation shuttle 1615 in the superior/inferior directions and can be locked in place using the locking nut 1620. The translation shuttle 1615 contains a spherical seat 1617 which engages the spherical ball of the abduction/adduction adjustment assembly 1700 (not shown) and can be used to provide three degrees of rotational freedom for the purpose of aligning the abduction/adduction adjustment assembly 1700 (not shown) with the femoral assembly 1800 (not shown). This motion also provides the surgeon with internal/external rotation adjustment as well as abduction/adduction adjustment while in surgery.

FIG. 17 shows a detail of the abduction/adduction adjustment link 1700 with the linear adjustment downlink 1705 which engages with the spherical joint of the translation shuttle 1605. The linear adjustment downlink 1705 is locked in place using a superior lock nut (not shown) in order to secure the three degrees of rotational freedom. The superior downlink 1710 is linearly engaged with the inferior downlink 1715 using opposing teeth which can be secured in placed using lock nuts 1720a and 1720b on the thread posts. The superior downlink 1710 and the inferior downlink 1715 can be spread apart to provide distraction of the spherical head 10 of the femur 8 from the acetabulum 6 of the pelvis 2 (not shown). Also shown is inferior lock nut 1720.

Figure 18:
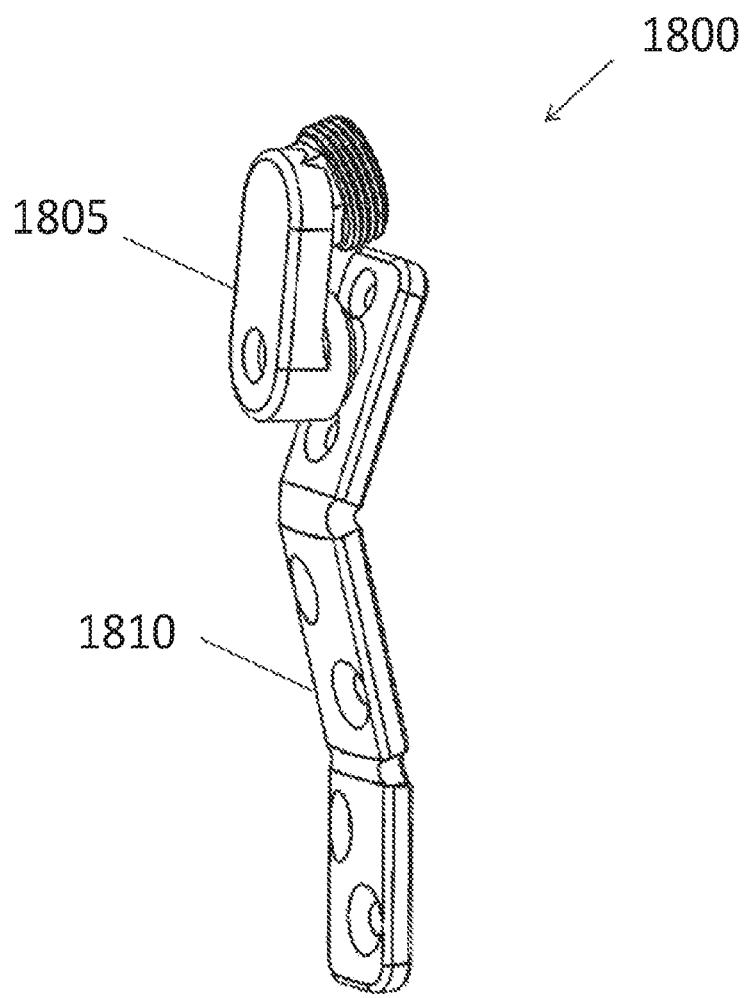
FIG. 18 shows a detail of the femoral assembly.

FIG. 18 shows a detail of the femoral assembly 1800. The flexion/extension arm 1805 is rotationally attached to a femoral attachment mechanism, which may include the lateral plate 1810 using a cylindrical mating attachment and bearing which provides rotation about the flexion/extension axis of the head of the femur. The superior portion of to the flexion/extension arm 1805 has a female spherical surface (not shown) to mate with the ball end of the inferior downlink 1715 (see FIG. 17) and male threads in order to mate with inferior lock nut 1720 (see FIG. 17). The lateral plate 1810 is securely fastened to the femur 8 using screws (not shown). The femoral attachment mechanism may alternatively include an intramedullary rod (not shown) which is placed into the intramedullary canal of the femur and secured rotationally using screws.

Components of the present invention may include a non-organic material that is durable and that can be implanted in a human body, such as titanium, stainless steel, spring steel, niobium, carbon fiber, ceramics, polymers (e.g., ultra-high-molecular-weight polyethylene (UHMWPE) or polyether ether ketone (PEEK)), composites or any relatively hard material (e.g. Titanium-Aluminium-Niobium-alloy). Generally, the material selected will be biocompatible, that is, compatible with the surrounding bone and tissue.

Each of the hip off-loading devices 100, 600, 1000, and 1500 may be a component of a kit, which may also include: bone screws, wrenches, distractors, surgical instruments, and/or drapes, gauzes, and other items commonly used in surgical procedures. The kit may generally be provided pre-sterilized, but the individual components may also be made available separately. Drills and other powered tools will generally be available in an orthopedic surgical setting. The components of the kit may be provided in various sizes to accommodate, e.g., pediatric patients, patients of different heights, patients that are in the process of a growth spurt, etc.

Figure 19:
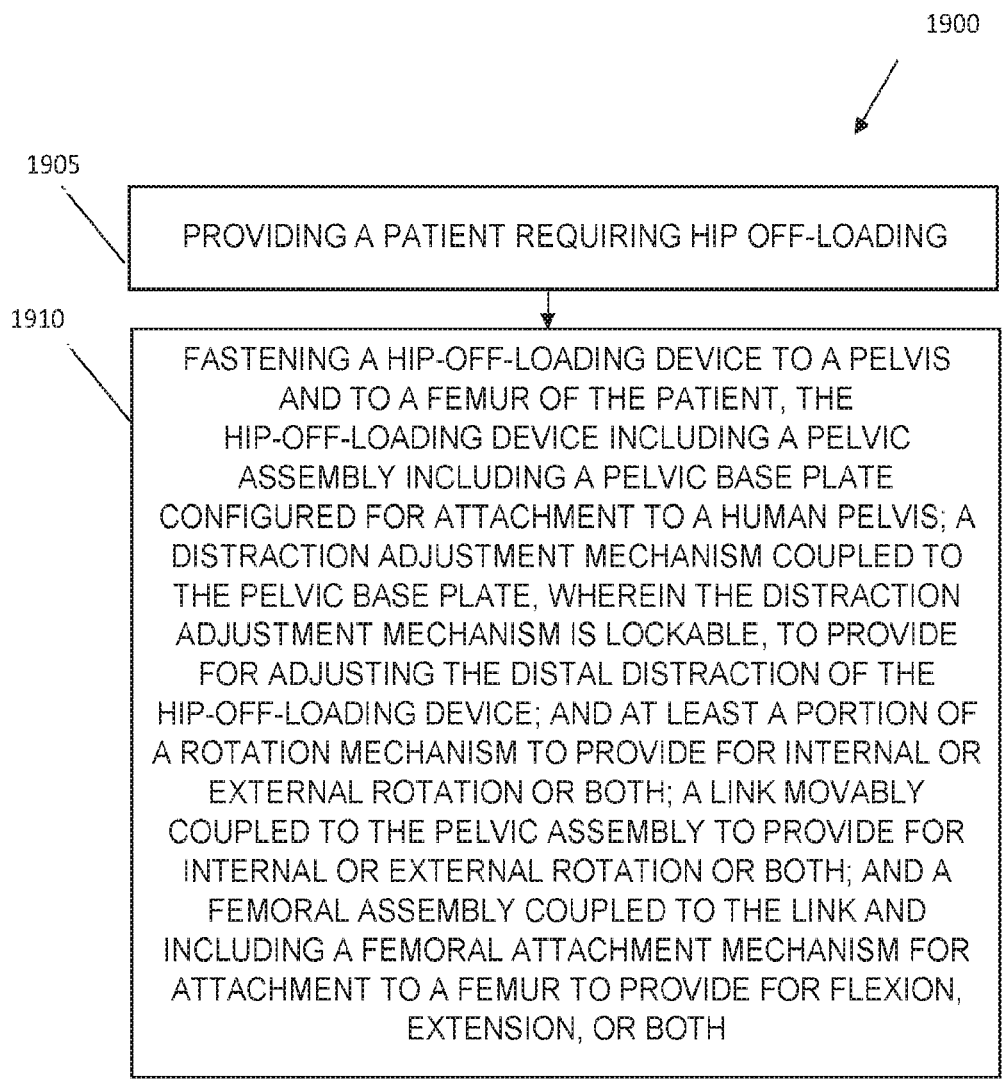
FIG. 19 is a flowchart of a method embodiment of the present invention.

FIG. 19 depicts a flowchart of a method embodiment of the present invention. Method 1900 begins with providing a patient requiring hip off-loading in Block 1905. Block 1910 includes fastening a hip-off-loading device to a pelvis and to a femur of the patient, the hip-off-loading device including a pelvic assembly including a pelvic base plate configured for attachment to a human pelvis; a distraction adjustment mechanism coupled to the pelvic base plate, wherein the distraction adjustment mechanism is lockable, to provide for adjusting the distal distraction of the hip-off-loading device; and at least a portion of a rotation mechanism to provide for internal or external rotation or both; a link movably coupled to the pelvic assembly to provide for internal or external rotation or both; and a femoral assembly coupled to the link and including a femoral attachment mechanism for attachment to a femur to provide for flexion, extension, or both.

One skilled in the art of medical treatment of human hip ailments will recognize that hip off-loading devices 100, 600, 1000, and 1500 and method 1900 provide less intrusive, less painful, less maintenance-intensive systems and methods for providing hip care.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of" As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

What is claimed is:

1. A hip-off-loading device comprising:
 a pelvic assembly comprising:
  a pelvic base plate configured for attachment to a human pelvis;
  a distraction adjustment mechanism coupled to the pelvic base plate, wherein the distraction adjustment mechanism is lockable, to provide for adjusting a distal distraction of the hip-off-loading device; and
  a portion of a rotation mechanism to provide for internal or external rotation or both, and to provide for non-dynamic interoperative adjustment of abduction, adduction, or both;
 a link movably coupled to the pelvic assembly to provide for internal or external rotation or both; and
 a femoral assembly movably coupled to the link and comprising a femoral attachment mechanism for attachment to a femur to provide for flexion, extension, or both;

wherein the distraction adjustment mechanism of the pelvic assembly comprises:
  a distraction post mounted on the pelvic base plate; and
  an adjustment screw threaded on the distraction post to provide for adjusting and setting the distraction of the hip-off-loading device;
wherein the portion of the rotation mechanism of the pelvic assembly comprises:
  at least one rotation mounting post mounted on the distraction post; and
  an internal/external rotation rail coupled to the at least one mounting post, wherein the internal/external rotation rail is arc-shaped;
  an internal/external rotation slider slidably coupled to the internal/external rotation rail, wherein the internal/external rotation slider comprises a link attachment point;
wherein the link comprises:
  an upper end comprising an upper attachment point rotatably and lockably coupled to the link attachment point of the pelvic assembly to provide for adjusting and setting an upper angle for the hip-off-loading;
  a threaded post coupled to the upper end of the link;
  an adjustment nut threaded onto the threaded post; and
  a lower end coupled to the threaded post, comprising a lower attachment point; and
wherein the femoral assembly comprises:
  a link attachment point rotatably and lockably coupled to the lower attachment point of the link to provide for a lower angle for the hip-off-loading device; and
  a flexion/extension arm rotatably coupled to the lower attachment point of the link, wherein the flexion/extension arm is coupled to the femoral attachment mechanism of the femoral assembly.

2. The device of claim 1, wherein:
the portion of the rotation mechanism of the pelvic assembly comprises:
  a rotational bearing coupled to the pelvic base plate; and
  a rotational slider rotationally coupled to the rotational bearing; and
wherein the distraction adjustment mechanism of the pelvic assembly comprises a turnbuckle at a distal end of the rotational slider, wherein the turnbuckle is rotatably adjustable to adjust the distraction of the hip-off-loading device;
wherein the link comprises:
  a downlink coupled to the turnbuckle, wherein the downlink comprises an abduction/adduction slot, wherein the abduction/adduction slot is arc-shaped; and
  an abduction/adduction slider bearing slidably coupled to the abduction/adduction slot to provide for abduction, adduction, or both; and
wherein the femoral assembly comprises:
  an abduction/adduction arm coupled to the abduction/adduction slider at an upper end of the abduction/adduction arm; and
  a lower end of the abduction/adduction arm is rotatably coupled to the femoral attachment mechanism of the femoral assembly.

3. The device of claim 1, wherein:
the distraction mechanism of the pelvic assembly comprises:
  a gear rack mounted through the pelvic base plate, comprising upper and lower rotational bearing surfaces;
  a worm drive engaged with the gear rack;
  a bevel gear engaged with the worm drive, wherein rotating the bevel gear turns the worm drive, which rotates the gear rack, moving the gear rack vertically; and
  an upper internal/external rotational bearing and a lower internal/external rotational bearing that engage the upper and lower rotational bearing surfaces of the gear rack, respectively, wherein the lower internal/external rotational bearing comprises a link attachment point;
wherein the link comprises:
  an upper end comprising an upper attachment point rotatably and lockably coupled to the link attachment point of the pelvic assembly to provide for adjusting and setting an upper angle for the hip-off-loading;
  a threaded post coupled to the upper end of the link;
  an adjustment nut threaded onto the threaded post; and
  a lower end coupled to the threaded post, comprising a lower attachment point; and
wherein the femoral assembly comprises:
  a link attachment point rotatably and lockably coupled to the lower attachment point of the link to provide for adjusting a lower angle for the hip-off-loading device;
  a flexion/extension arm rotatably coupled to the link attachment point, wherein the flexion/extension arm is coupled to the femoral attachment mechanism of the femoral assembly.

4. The device of claim 1, wherein:
the distraction mechanism of the pelvic assembly comprises:
  an adjustment screw mounted through the pelvic base plate; and
  a translation shuttle engaged with the adjustment screw, comprising a spherical seat;
wherein the link comprises:
  a linear adjustment downlink with a spherical surface that engages the spherical seat of the pelvic assembly;
  a superior downlink coupled to the linear adjustment downlink;
  an inferior downlink engaged with the superior downlink;
  a spherical seat; and
wherein the femoral assembly comprises:
  a spherical surface that engages the spherical seat of the link;
  a flexion/extension arm rotatably coupled to the link attachment point, wherein the flexion/extension arm is coupled to the femoral attachment mechanism of the femoral assembly.

5. The device of claim 1, wherein the femoral attachment mechanism is a lateral plate or a femoral component configured to be installed in an intramedullary canal.

6. The device of claim 1, wherein the hip-off-loading device comprises titanium, stainless steel, spring steel, niobium, carbon fiber, ceramics, polymers, or combinations thereof.

7. The device of claim 1, wherein the pelvic assembly, the link, or the femoral assembly, or combinations thereof, is adjustable to accommodate patient-specific anatomies.

8. A kit comprising:
a hip-off-loading device comprising:
  a pelvic assembly comprising:
    a pelvic base plate configured for attachment to a human pelvis;

a distraction adjustment mechanism coupled to the pelvic base plate, wherein the distraction adjustment mechanism is lockable, to provide for adjusting a distal distraction of the hip-off-loading device; and a portion of a rotation mechanism to provide for internal or external rotation or both;

a link movably coupled to the pelvic assembly to provide for internal or external rotation or both; and a femoral assembly coupled to the link and comprising a femoral attachment mechanism for attachment to a femur to provide for flexion, extension, or both;

wherein the distraction adjustment mechanism of the pelvic assembly comprises:

a distraction post mounted on the pelvic base plate; and an adjustment screw threaded on the distraction post to provide for adjusting and setting the distraction of the hip-off-loading device;

wherein the portion of the rotation mechanism of the pelvic assembly comprises:

at least one rotation mounting post mounted on the distraction post; and an internal/external rotation rail coupled to the at least one mounting post, wherein the internal/external rotation rail is arc-shaped;

an internal/external rotation slider slidably coupled to the internal/external rotation rail, wherein the internal/external rotation slider comprises a link attachment point;

wherein the link comprises:

an upper end comprising an upper attachment point rotatably and lockably coupled to the link attachment point of the pelvic assembly to provide for adjusting and setting an upper angle for the hip-off-loading;

a threaded post coupled to the upper end of the link;

an adjustment nut threaded onto the threaded post; and a lower end coupled to the threaded post, comprising a lower attachment point; and wherein the femoral assembly comprises:

a link attachment point rotatably and lockably coupled to the lower attachment point of the link to provide for a lower angle for the hip-off-loading device; and a flexion/extension arm rotatably coupled to the lower attachment point of the link, wherein the flexion/extension arm is coupled to the femoral attachment mechanism of the femoral assembly.

9. The kit of claim 8, wherein the femoral attachment mechanism is a lateral plate or an intramedullary rod.

10. The kit of claim 8, wherein the hip-off-loading device comprises titanium, stainless steel, spring steel, niobium, carbon fiber, ceramics, polymers, or combinations thereof.

11. The kit of claim 8, wherein the pelvic assembly, the link, or the femoral assembly, or combinations thereof, is adjustable to accommodate patient-specific anatomies.

12. A method of providing hip-off-loading comprising:
providing a patient requiring hip-off-loading; and
fastening a hip-off-loading device to a pelvis and to a femur of the patient, the hip-off-loading device comprising:

a pelvic assembly comprising:

a pelvic base plate configured for attachment to the pelvis;

a distraction adjustment mechanism coupled to the pelvic base plate, wherein the distraction adjustment mechanism is lockable, to provide for adjusting a distal distraction of the hip-off-loading device; and a portion of a rotation mechanism to provide for internal or external rotation or both;

a link movably coupled to the pelvic assembly to provide for internal or external rotation or both; and a femoral assembly coupled to the link and comprising a femoral attachment mechanism for attachment to the femur to provide for flexion, extension, or both;

wherein the distraction adjustment mechanism of the pelvic assembly comprises:

a distraction post mounted on the pelvic base plate; and an adjustment screw threaded on the distraction post to provide for adjusting and setting the distraction of the hip-off-loading device;

wherein the portion of the rotation mechanism of the pelvic assembly comprises:

at least one rotation mounting post mounted on the distraction post; and an internal/external rotation rail coupled to the at least one mounting post, wherein the internal/external rotation rail is arc-shaped;

an internal/external rotation slider slidably coupled to the internal/external rotation rail, wherein the internal/external rotation slider comprises a link attachment point;

wherein the link comprises:

an upper end comprising an upper attachment point rotatably and lockably coupled to the link attachment point of the pelvic assembly to provide for adjusting and setting an upper angle for the hip-off-loading;

a threaded post coupled to the upper end of the link;

an adjustment nut threaded onto the threaded post; and a lower end coupled to the threaded post, comprising a lower attachment point; and wherein the femoral assembly comprises:

a link attachment point rotatably and lockably coupled to the lower attachment point of the link to provide for a lower angle for the hip-off-loading device; and a flexion/extension arm rotatably coupled to the lower attachment point of the link, wherein the flexion/extension arm is coupled to the femoral attachment mechanism of the femoral assembly.

13. The method of claim 12, wherein the femoral attachment mechanism is a lateral plate or an intramedullary rod.

14. The method of claim 12, wherein the hip-off-loading device comprises titanium, stainless steel, spring steel, niobium, carbon fiber, ceramics, polymers, or combinations thereof.

15. The method of claim 12, further comprising adjusting the pelvic assembly, the link, or the femoral assembly, or combinations thereof, to accommodate one or more anatomical features specific to the patient.

\* \* \* \* \*